Aug. 14, 1945.     H. ST. PIERRE     2,382,344
DETACHABLE CHAIN LINK
Filed Aug. 24, 1942
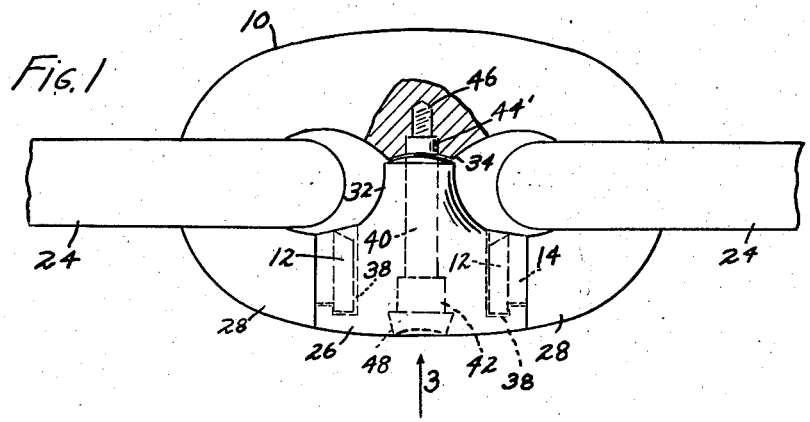
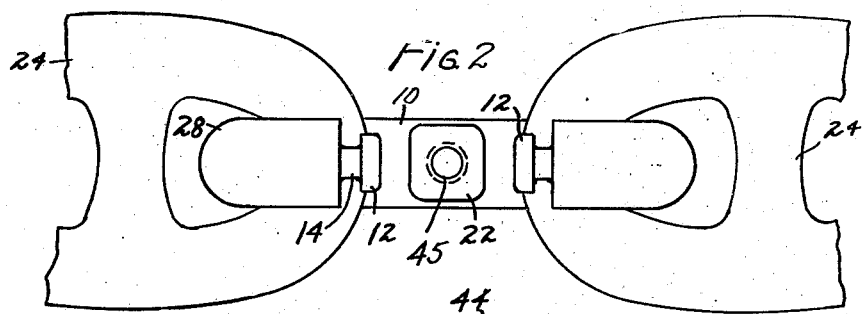
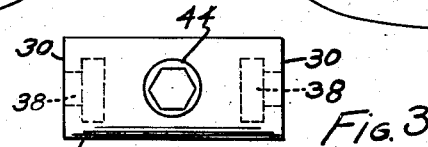
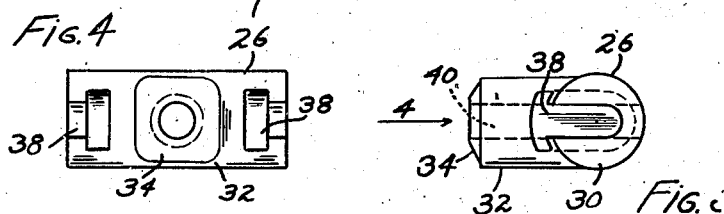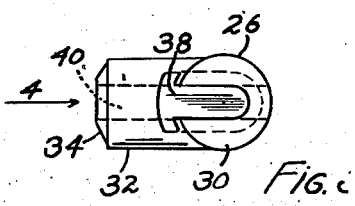
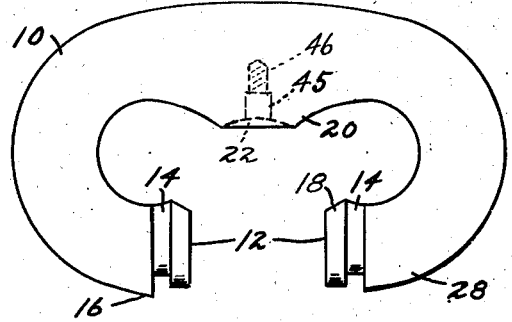
INVENTOR
HENRY ST. PIERRE
By Attorney
Charles R. Fay Patented Aug. 14, 1945

2,382,344

UNITED STATES PATENT OFFICE 2,382,344

DETACHABLE CHAIN LINK

Henry St. Pierre, Worcester, Mass.

Application August 24, 1942, Serial No. 455,883

2 Claims. (Cl. 59—85)

This invention relates to detachable chain links primarily for heavy duty use.

Objects of the invention include the provision of a detachable chain link comprising a forged C-shaped member having connection shoulders at the ends of the C, and a single unitary forged coupling member having means to receive the connection shoulders to close the open side of the C-shaped member, there being provided a special bolt for securing said members together in link-forming condition.

Other objects of the invention include the provision of a relatively easily manufactured and operable detachable chain link comprising a total of only three parts: a C-shaped main member, a coupling member for closing the open side of the C-shaped member, and a special bolt extending completely through the coupling and into but not passing through the solid side of the C-shaped member, this bolt comprising a long plain body having at one end a short reduced screw thread for cooperation with screw threads at the solid side of the C-shaped member, the body being effective to resist and overcome any transverse or longitudinal stresses between the C-shaped member and the coupling, the screw thread connection being depended upon only for preventing edgewise disengaging movement of the coupling member.

Other objects and advantages of the invention will appear hereinafter.

Reference is to be had to the accompanying drawing in which:

Fig. 1 is a plan view of the new detachable link with part in section, and showing the link connected with the next adjacent links in the chain;

Fig. 2 is an edge view of the detachable link and shows the connected links, the coupling member being removed;

Fig. 3 is a view in elevation of the coupling member looking in the direction of arrow 3 in Fig. 1;

Fig. 4 is a view in elevation of the coupling member looking in the direction of arrow 4 in Fig. 5;

Fig. 5 is a view in end elevation of the coupling member, and

Fig. 6 is a plan view of the C-shaped link member.

The main link part is indicated in the drawing at 10 and comprises a forged C-shaped member of, for instance, steel or an alloy, and this C-shaped member is provided at its ends with shoulders 12 formed by reduced recesses or necks 14. Shoulders 12 are elongated in the plane of the link and thus have a length in the link plane longer than their heights, which may be said to be the dimension in a plane normal to the link plane. The outer ends of shoulders 12 stop short of the outer aspect of the link as for instance as indicated at 16 in Fig. 6, but they extend inwardly to the surfaces of eyes of the link as indicated at 18 in Fig. 6. Thus it will be seen that shoulders 12, although comparatively narrow, are of sufficient section to be strong enough for chains of this type.

It is contemplated that the present link may be of the central stud type and in this event a boss 20 is provided at the solid side of C-shaped member 10, this boss extending towards the open side of member and being located substantially centrally of shoulders 12. A depression 22 may be formed in the boss for a purpose to be described.

The adjacent links are indicated generally at 24 and it will be seen that these links are easily insertible in the eyes of the C-shaped member 10 by entering them therein through the open side of member 10.

To close the open side of the C-shaped member to complete the detachable link, I have provided a generally T-shaped closing or coupling member. This coupling member comprises a generally barrel-shaped head 26 which is formed at each end to mate with and in effect continue the ends 28 of C-shaped member 10, these ends having flat surfaces for the close reception therebetween of the flat ends 30 of head 26. The leg of the T-shaped coupling member is formed by a rounded boss 32 extending centrally of the coupling member head 26, and a rounded projection 34 is provided at the free end of boss 32 for entry into the depression 22.

The free ends of head 26 of the T-shaped coupling member are extended from the sides of boss 32 past the center of head 26, and are formed with undercut or T-shaped slots 38 which are provided to receive the shoulders 12 and necks 14 of the C-shaped member by means of a straight sliding movement transversely of but in the plane of the link, as for instance in the direction indicated by the arrow 3 in Fig. 1. The head 26 and the boss 32 are drilled through as shown in Fig. 1 at 40, there being provided an enlarged drilled portion 42 which is adapted to receive the head 44 of a bolt. This bolt has a plain integral body 44′ which extends from the head of the bolt almost to the other end thereof and this body will be located in a tightly fitting circular recess 45 in boss 20 extending inwardly from the bottom of depression 22. In extension of the plain body the bolt is provided with a reduced threaded portion 46 which is adapted to be threaded into a reduced tapped hole in the C-shaped member as clearly shown in Fig. 1. There is an undercut formed in the head 26 of the T-shaped coupling member at the bore for the purpose of receiving a lead plug 48 to seal up the head 44 of the bolt.

In order to insert the detachable link in a chain it is necessary only to place the adjacent links 24 in the eyes of the detachable link by entering them between the shoulders 12 at the open side of C-shaped member 10. The T-shaped coupling is then merely slid into place as above described with projection 34 entered into depression 22. The bolt is then thrust through its bore in the T-shaped coupling member and turned up tightly, by means of threads 46. The head of the bolt is received wholly within the enlarged bore 42, and therefore the lead plug 48 may be hammered into position over the bolt head to prevent it from being turned outwardly and also to prevent entry of moisture or water, so that the bolt cannot rust. This lead plug may be easily removed if it is desired to detach the link.

It will be seen from the above that I have provided a relatively simple and easily manufactured but very sturdy detachable link which requires but two solid forged members and a single fastening bolt. Any endwise or transverse strains between the C-shaped member 10 and the coupling member will be taken up by the body 44 of the bolt, so that there will be little if any strain ever placed on the screw threads 46, and the only function of these screw threads will be to prevent withdrawal of the coupling member from the C-shaped member in an edgewise direction, shoulders 12 in cooperation with slots 38 preventing any movement of the coupling relative to the C-shaped member in all other directions.

Having thus described my invention and the advantages thereof, I do not wish to be limited to the details herein disclosed, otherwise than as set forth in the claims, but what I claim is:

1. A detachable chain link comprising a main C-shaped link member having a pair of opposed free ends, said ends being spaced to define an opening therebetween, connection shoulders at said ends, a boss at the side of said link member opposite the opening and extending towards the latter, a depression in said boss, a single unitary coupling member of general T-shape for closing the opening, the head of the T being adapted to fit between said link-member free ends, slots in said head for receiving said shoulders in interengaging relation by a sliding motion in one relative direction only, a bore through the head of the T and extending through the leg of the T, the free end of the leg fitting said depression, a bolt extending through said bore and into said boss, a bore in said boss and a tapped hole at the bottom of the last-named bore, said bolt extending into and fitting the latter and having a screw threaded portion to be threaded into said tapped hole, said bolt closely fitting the last named bore at its unthreaded portion.

2. A detachable chain link comprising a member having an open side, a shoulder at each end of the member at said open side, said shoulders being elongated in the plane of the link, a bore in said member opposite the open side, a one piece coupling for closing said open side, said coupling having an element extending across the link to form a stud, undercut slots in said coupling to receive said shoulders, a bore all the way through the coupling and element, said bores being aligned and of substantially the same diameter, a headed bolt having a plain body extending into both bores, screw threads at the end of the bolt opposite its head, and a tapped hole at the bottom of the first named bore for cooperation therewith, said threads being the sole securing means for the member and coupling, said threads and tapped hole being reduced in diameter relative to the body.

HENRY ST. PIERRE.